US010649168B2

(12) United States Patent
Marrapode et al.

(10) Patent No.: US 10,649,168 B2
(45) Date of Patent: May 12, 2020

(54) ILLUMINATED TRACER CABLE

(71) Applicant: Molex, LLC, Lisle, IL (US)

(72) Inventors: Thomas R. Marrapode, Chicago, IL (US); Chris Scherer, Dripping Springs, TX (US); Jon K. Sholtis, Buda, TX (US)

(73) Assignees: Molex, LLC, Lisle, IL (US); Mertek Industries, LLC, Austin, TX (US)

( * ) Notice: Subject to any disclaimer, the term of this patent is extended or adjusted under 35 U.S.C. 154(b) by 0 days.

(21) Appl. No.: 15/994,525

(22) Filed: May 31, 2018

(65) Prior Publication Data

US 2018/0348459 A1 Dec. 6, 2018

Related U.S. Application Data

(60) Provisional application No. 62/513,260, filed on May 31, 2017.

(51) Int. Cl.
| | |
|---|---|
| *G02B 6/44* | (2006.01) |
| *F21V 23/02* | (2006.01) |
| *H01B 11/00* | (2006.01) |
| *F21V 23/04* | (2006.01) |
| *H04Q 1/02* | (2006.01) |
| *F21V 8/00* | (2006.01) |
| *F21Y 115/10* | (2016.01) |
| *F21Y 115/20* | (2016.01) |

(52) U.S. Cl.
CPC .............. *G02B 6/447* (2013.01); *F21V 23/02* (2013.01); *F21V 23/04* (2013.01); *G02B 6/001* (2013.01); *G02B 6/0003* (2013.01); *G02B 6/0006* (2013.01); *G02B 6/4415* (2013.01); *H01B 11/00* (2013.01); *H04Q 1/136* (2013.01); *F21Y 2115/10* (2016.08); *F21Y 2115/20* (2016.08)

(58) Field of Classification Search
CPC .... G02B 6/447; G02B 6/0003; G02B 6/0006; G02B 6/001; G02B 6/4415; F21V 23/02; F21V 23/04; H01B 11/00; H04Q 1/136
USPC ......................................................... 362/234
See application file for complete search history.

(56) References Cited

U.S. PATENT DOCUMENTS

| | | | | |
|---|---|---|---|---|
| 7,147,347 | B1* | 12/2006 | Khachakian | ........ F21V 33/0056 362/227 |
| 7,556,524 | B2 | 7/2009 | Kuo et al. | |
| 9,419,377 | B2* | 8/2016 | Zhu | ........ H01R 13/24 |
| 9,685,726 | B2 | 6/2017 | Ang et al. | |
| 2004/0022053 | A1* | 2/2004 | Sharon | .......... H05B 33/00 362/84 |
| 2004/0160774 | A1* | 8/2004 | Lionetti | ............ H01B 7/366 362/253 |
| 2005/0013563 | A1* | 1/2005 | Woodruff | ............ H01R 9/0515 385/101 |
| 2005/0215110 | A1* | 9/2005 | Chen | .......... H01R 13/641 439/502 |
| 2009/0027913 | A1* | 1/2009 | Baranski | ............ B60Q 1/0017 362/541 |

(Continued)

*Primary Examiner* — Bryon T Gyllstrom
(74) *Attorney, Agent, or Firm* — Molex, LLC

(57) ABSTRACT

An illuminated tracer cable system includes a signal carrying cable comprising a signal connector on each end of the signal carrying cable, an electroluminescent (EL) wire coupled to the signal carrying cable, and a magnetic power connector coupled to an end of the EL wire configured to provide power to the EL wire.

11 Claims, 6 Drawing Sheets

(56) References Cited

U.S. PATENT DOCUMENTS

| | | | |
|---|---|---|---|
| 2010/0046210 A1* | 2/2010 | Mathai | H01L 51/52 362/147 |
| 2010/0327766 A1* | 12/2010 | Recker | H02J 7/025 315/291 |
| 2014/0140076 A1* | 5/2014 | Morrow | H01R 13/6641 362/382 |
| 2015/0332810 A1* | 11/2015 | Crossland | H01B 11/22 362/582 |

* cited by examiner

ILLUMINATED TRACER CABLE

RELATED APPLICATIONS

This application claims priority to U.S. Provisional Application No. 62/513,260, filed May 31, 2017, which is incorporated herein by reference in its entirety.

TECHNICAL FIELD

This disclosure relates to the field of signal transmission cables, more specifically to an illuminated data transmission cable.

DESCRIPTION OF RELATED ART

Networking cables carry data from one computer-related device to another. Computer-related devices include terminals, personal computers, printers, workstations, hubs, switches, storage devices, tape drives, and servers. Such networking cables often are used in systems where there are many networking cables connected to frames or panels, each of which may have many connecting cables and which may be located closely adjacent other similar panels, sometimes without carefully regimented management of the cables. The connections of each cable may be remote from one another, even being in separate rooms or spaces, whereby the networking cables may be of substantial length. Tracing and identifying a remote connector section or end of a specific cable for changing its connection in a network or to facilitate replacement often is difficult, tedious and time consuming, and can lead to errors which create further service problems and additional costs.

SUMMARY

In one aspect, an illuminated tracer cable includes a signal carrying cable comprising a signal connector on each end of the signal carrying cable, an electroluminescent (EL) wire coupled to the signal carrying cable, and a magnetic power connector coupled to an end of the EL wire configured to provide power to the EL wire.

BRIEF DESCRIPTION OF THE DRAWINGS

The present application is illustrated by way of example and not limited in the accompanying figures in which like reference numerals indicate similar elements and in which.

DETAILED DESCRIPTION

The detailed description that follows describes exemplary embodiments and the features disclosed are not intended to be limited to the expressly disclosed combination(s). Therefore, unless otherwise noted, features disclosed herein may be combined together to form additional combinations that were not otherwise shown for purposes of brevity.

Illuminated tracer cables can connect various network devices to help identify a particular cable from one cable end to another. The illuminated tracer cable includes a signal connector on each end of the illuminated cable to connect to the network devices. For example, the network devices can include switches, routers, optical transceivers. Example optical transceivers include small form-factor pluggable (SFP) transceivers, C form-factor pluggable (CFP) transceivers and/or other similar devices. When connected to a power source, substantially the entire length of the illuminated tracer cable can light up to help a networking technician identify the illuminated tracer cable.

Figure 1:
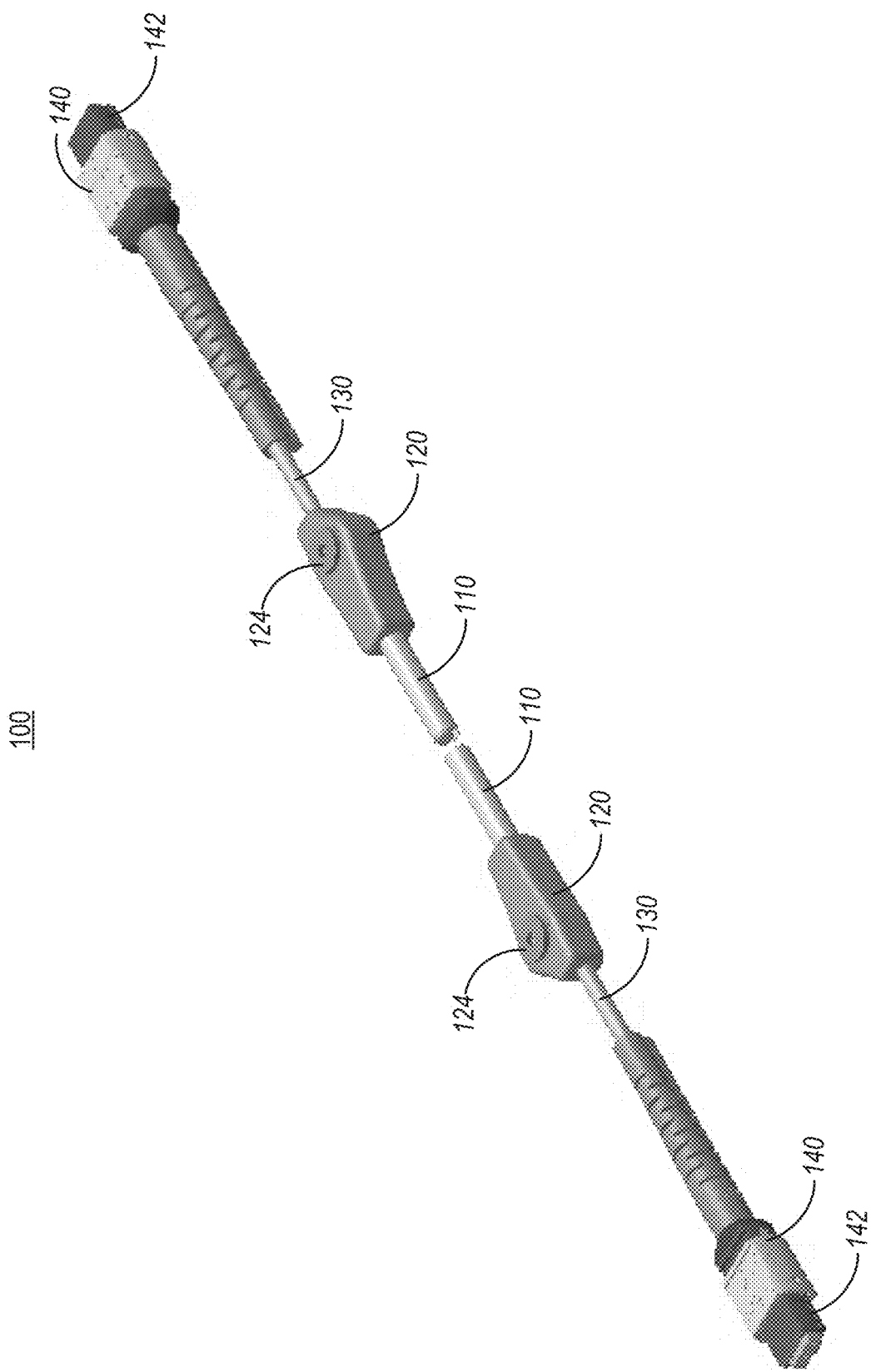
FIG. 1 is a top perspective view of illuminated tracer cable system.
Figure 2:
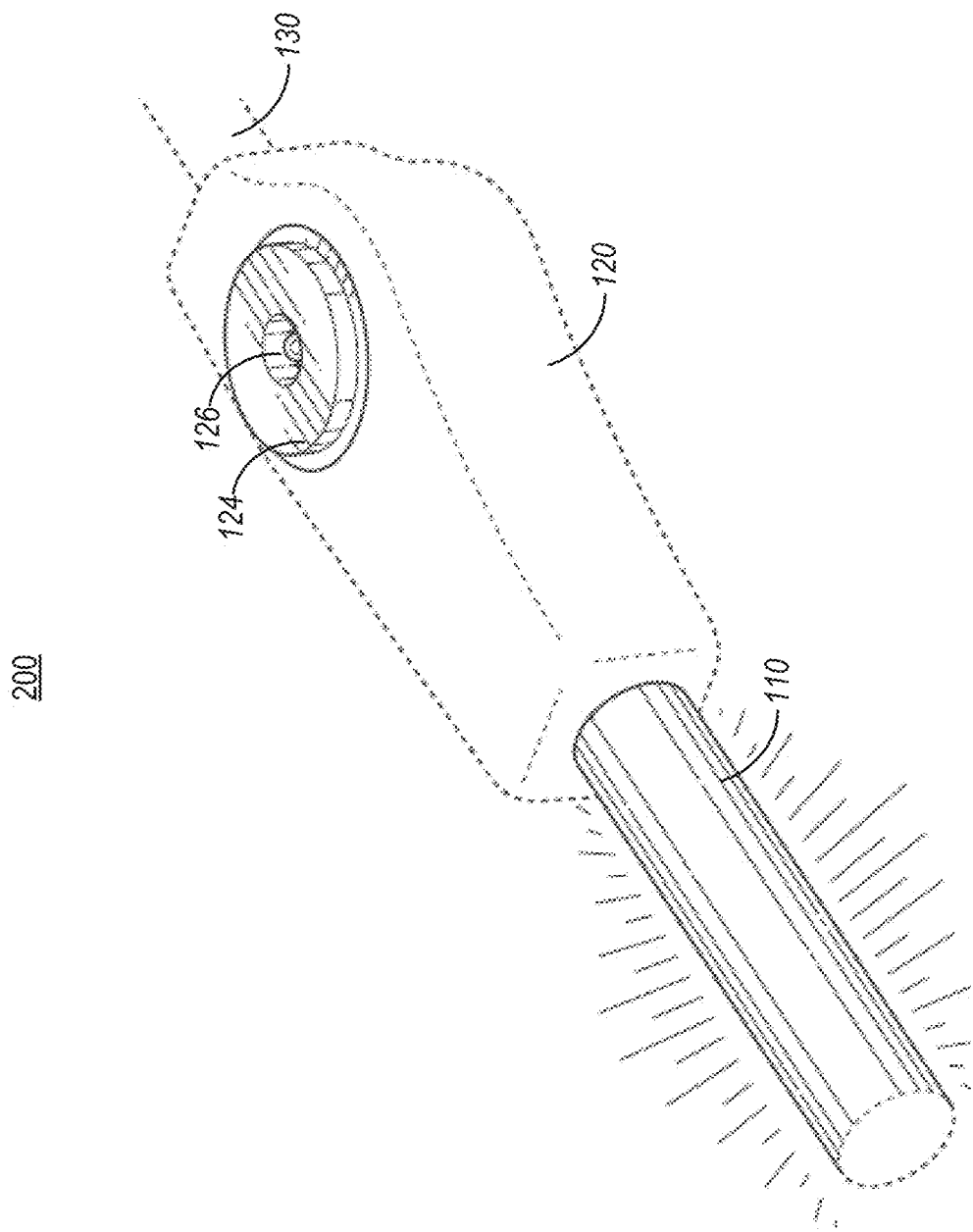
FIG. 2 is a close-up view of the illuminated tracer cable system of FIG. 1.
Figure 3:
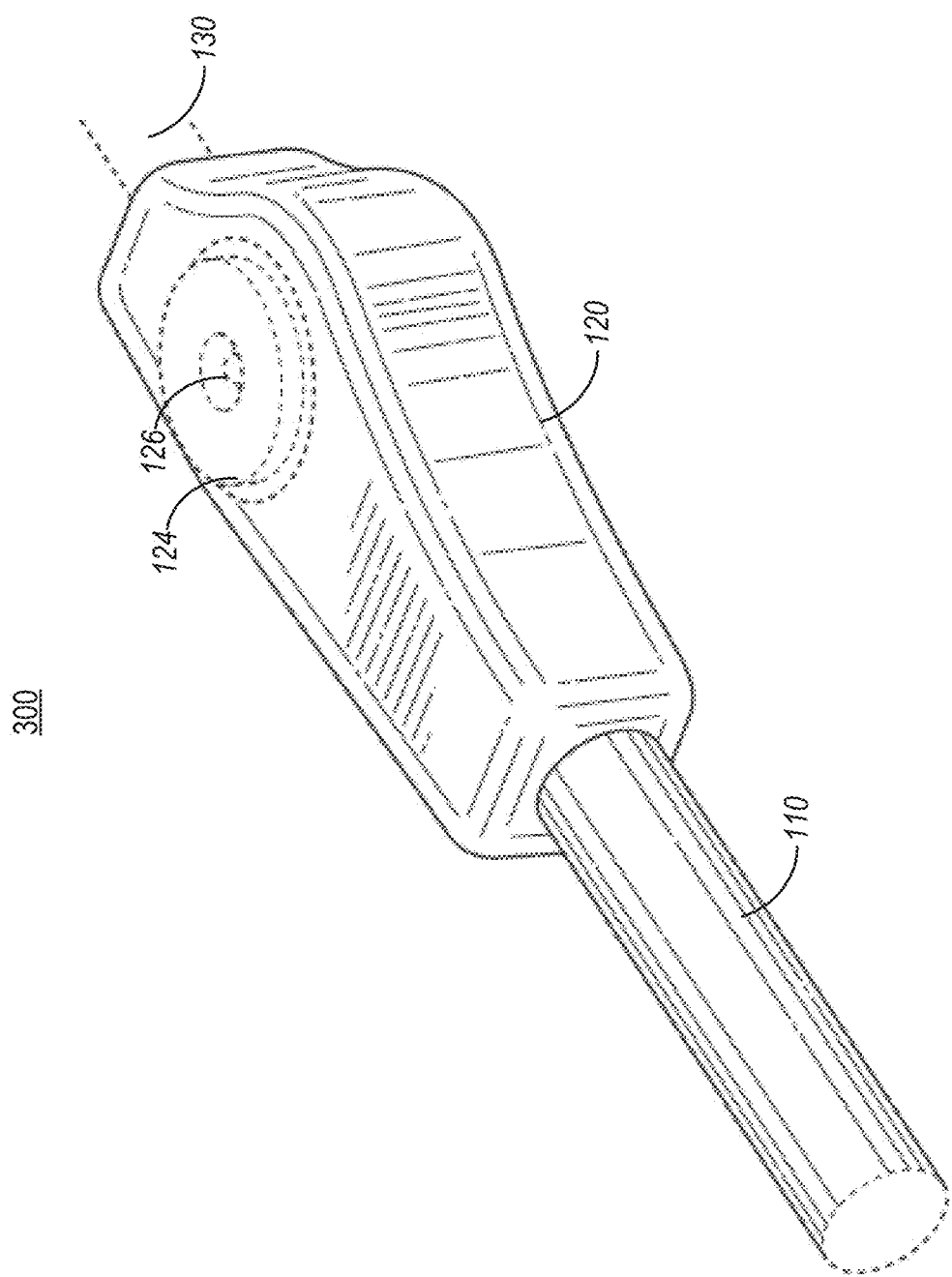
FIG. 3 is another close-up view of the illuminated tracer cable system of FIG. 1.

FIG. 1 is a top perspective view of an example illuminated tracer cable system 100. The illuminated tracer cable system 100 includes a data connector body 140, a first cable section 130, a power dongle body 120, and an illuminated tracer cable 110. FIG. 2 is a close-up view of the illuminated tracer cable system of FIG. 1. FIG. 3 is another close-up view of the illuminated tracer cable system of FIG. 1.

The data connector body 140 includes a data connector 142 for connecting to a networking device (not shown). The data connector body 140 can be held by a user to allow connecting or disconnecting the illuminated tracer cable system 100 to the networking device. In some implementations, the data connector body 140 is separated from the power dongle body 120 by a first cable section 130. In some other implementations (not shown), the data connector body 140 is combined with the power dongle body 120 into a single enclosure. Keeping the data connector body 140 separated from the power dongle body 120 is advantageous when connector space is limited and many data connector bodies are placed in a high density arrangement or in the case where the data connector might be impaired from its initial mechanical performance by the inclusion of additional length or modification. The power dongle body 120 being separated away from the data connector body 120 allows a user to more easily access the power dongle body 120.

The illuminated tracer cable 110 can include a signal carrying cable and an EL wire. For example, the signal carrying cable can carry electrical signals, such as a copper wire cable or optical signals, such as an optical fiber cable.

For example, in some implementations, the EL wire can be constructed from five major components. First is a solid-copper wire core, coated with phosphor. A very fine wire or pair of wires is spiral-wound around the phosphor-coated copper core and then the outer ITO conductive coating is evaporated on. The fine wire is electrically isolated from the copper core. Surrounding the combined copper core, phosphor, and fine copper wire is a clear PVC sleeve. Finally, surrounding this thin, clear PVC sleeve is another clear, colored translucent, or fluorescent PVC sleeve. An alternating current electric potential of approximately 90 to 120 volts at about 1000 Hz is applied between the copper core wire and the fine wire that surrounds the copper core. The wire can be modeled as a coaxial capacitor where the rapid charging and discharging of this capacitor excites the phosphor to emit light. A resonant oscillator can be used to generate the high voltage drive signal. Because of the capacitance load of the EL wire, using an inductive (coiled) transformer makes the driver a very efficient tuned LC oscillator. In some other embodiments, a single chip switched capacitor inverter IC can also be used instead of a LC oscillator.

The power dongle body 120 includes a magnetic power connector 124. In some implementations, the magnetic power connector 124 is configured to magnetically couple to a power connector lead of a battery powered cable power module (not shown). When the power connector lead of the cable power module is moved near the magnetic power connector 124, the power connector lead becomes mechanically attached to the magnetic power connector 124 at an attachment point 126. The attachment point 126 can be recessed from the magnetic power connector 124. For example, a magnet on the power connector lead of the cable power module connects to another magnet on the magnetic power connector 124. The cable power module is removably and magnetically coupled to the magnetic power connector 124. For example, the power source can be a battery or an EL wire inverter/driver. In some implementations, the EL wire 116 is powered on immediately when connected to the power source.

In some implementations, the attachment point 126 of the magnetic power connector 124 and/or the power connector lead include recessed electrical leads. The recessed electrical leads help prevent accidental shock to a user when connecting the cable power module to the magnetic power connector.

In some implementations, the cable power module includes an inverter, an external battery, and a controller. In some implementations, the controller is configured to supplying power only if the magnetic power connector is connected to the cable power module. In some implementations, the controller is configured to stop supplying power only if the magnetic power connector is detected to become disconnected from the cable power module. These safety features also help prevent accidental shock to the user. In some implementations, the controller is configured to measure a capacitance of the EL wire to determine a length measurement of the EL wire.

Figure 4:
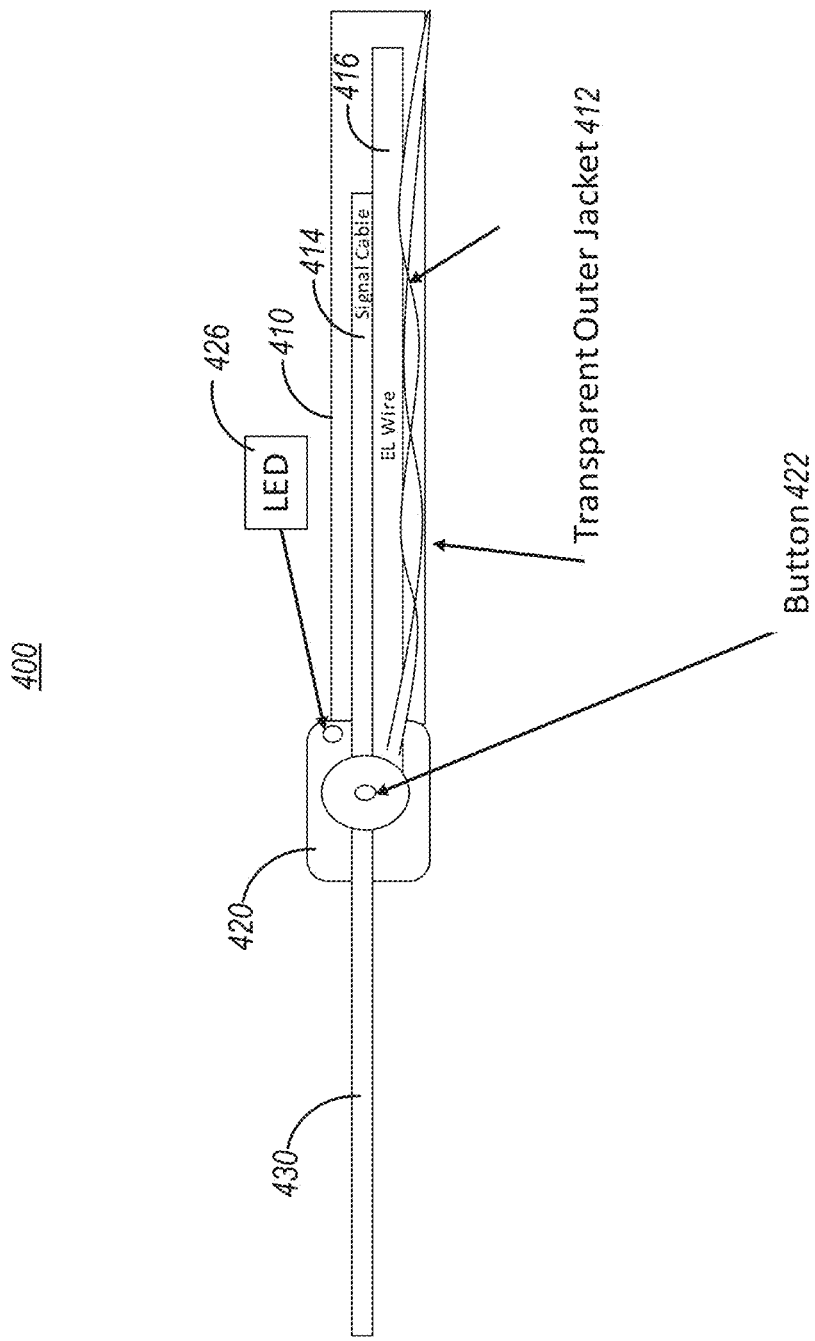
FIG. 4 is a top plan view of a second illuminated tracer cable system.
Figure 5:
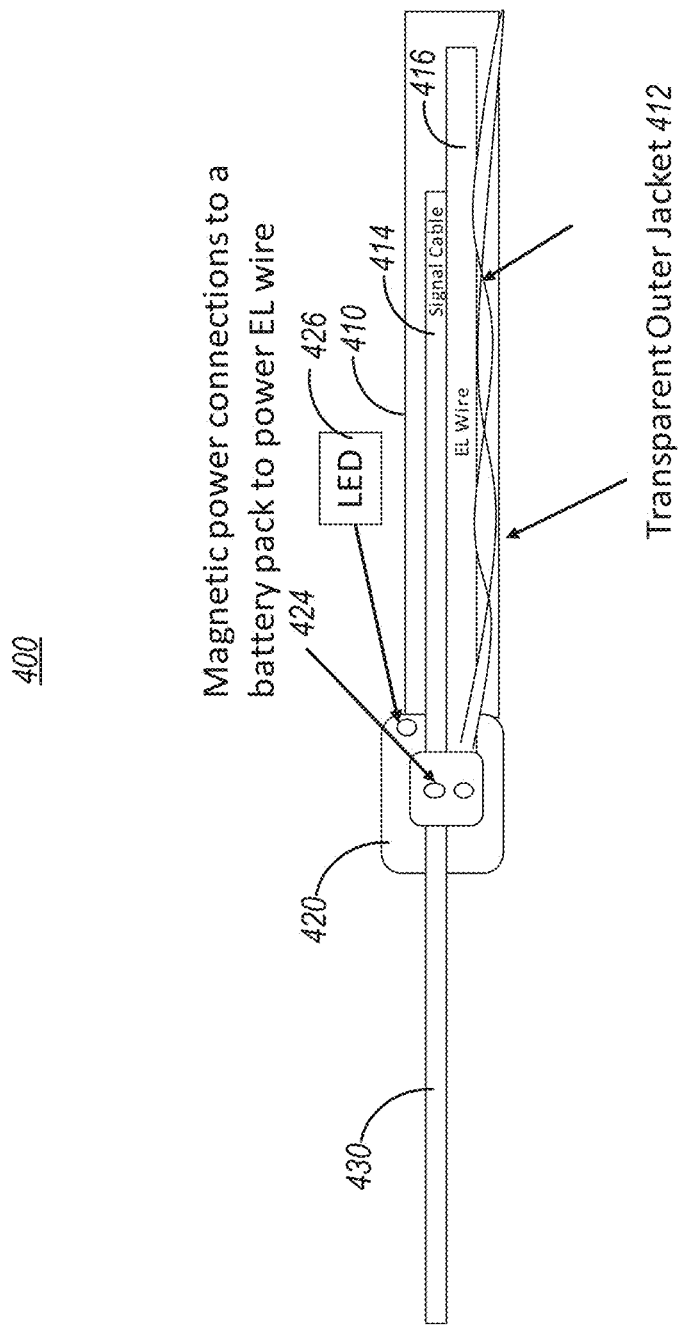
FIG. 5 is a bottom plan view of the second illuminated tracer cable system of FIG. 4.

FIG. 4 is a top plan view of an example second illuminated tracer cable system 400 showing an alternative design. FIG. 5 is a bottom plan view of the second illuminated tracer cable system 400 of FIG. 4. The illuminated tracer cable system 400 includes a first cable section 430, a power dongle body 420, and an illuminated tracer cable 410.

In some implementations, the power dongle body 420 can include a button 422 as shown in FIG. 4. The power dongle body 420 can further include a light emitting diode (LED) and an internal battery electrically coupled to the LED. It is contemplated that a second power dongle body (not shown) is on the other far end of the illuminated tracer cable 410, which includes a second LED. The button on the power dongle body 420 is configured to turn on both the LED and the second LED on the second power dongle body. This method of identifying cables may be useful when a cable power module is not available.

Figure 6:
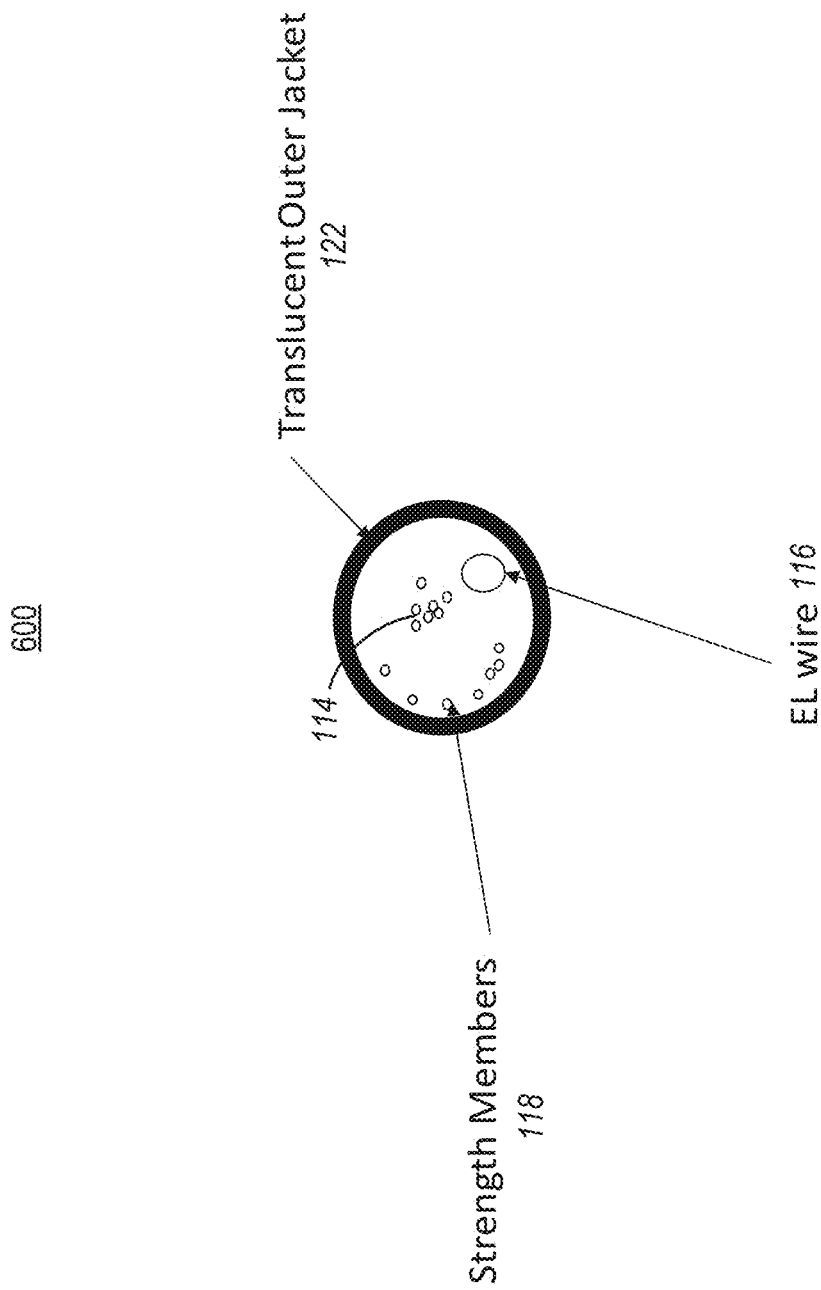
FIG. 6 is a cross-sectional side plan view of an example illuminated tracer cable.

FIG. 6 is a cross-sectional side plan view of an example illuminated tracer cable 600. The second cable section 110 includes both a signal carrying cable 114 and an electroluminescent (EL) wire 116. In some implementations, the illuminated tracer cable system can include a transparent outer jacket surrounding the signal carrying cable and the EL wire. For example, the transparent outer jacket can be an 8F MM 3-6 mm OD. The illuminated tracer cable can also include at least one strength member 118 inside the transparent outer jacket to add strength and/or rigidity to the illuminated tracer cable 110.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. An illuminated tracer cable system comprising:
a signal carrying cable comprising a signal connector on an end of the signal carrying cable, wherein the signal connector has a signal connector housing that encloses the signal carrying cable;
an electroluminescent (EL) wire coupled to a portion of the signal carrying cable; and
a magnetic power connector coupled to an end of the EL wire configured to provide power to the EL wire, wherein the magnetic power connector comprises a raised magnetic coupler structure that encircle recessed electrical contacts, and wherein the magnetic power connector is mounted on a power connector housing, wherein a portion of the signal carrying cable separates the signal connector housing and the power connector housing.

2. The illuminated tracer cable system of claim 1, further comprising a transparent outer jacket surrounding the signal carrying cable and the EL wire.

3. The illuminated tracer cable system of claim 2, further comprising at least one strength member inside the transparent outer jacket.

4. The illuminated tracer cable system of claim 1, further comprising a button.

5. The illuminated tracer cable system of claim 4, further comprising a light emitting diode (LED) and an internal battery electrically coupled to the LED, wherein the button is configured to power on or off the LED.

6. The illuminated tracer cable system of claim 1, further comprising a body enclosure which houses the signal connector and the magnetic power connector.

7. The illuminated tracer cable system of claim 1, further comprising a cable power module with a power connector lead, wherein the magnetic power connector is configured to magnetically couple to the power connector lead.

8. The illuminated tracer cable system of claim 7, wherein the cable power module further comprises an inverter, a power module battery, and a controller.

9. The illuminated tracer cable system of claim 8, wherein the controller is configured to supplying power only if the magnetic power connector is connected to the cable power module.

10. The illuminated tracer cable system of claim 8, wherein the controller is configured to stop supplying power only if the magnetic power connector is detected to become disconnected from the cable power module.

11. The illuminated tracer cable system of claim 8, wherein the controller is configured to measure a capacitance of the EL wire to determine a length measurement of the EL wire.

\* \* \* \* \*